United States Patent [19]

Rubin et al.

[11] Patent Number: 4,561,994

[45] Date of Patent: Dec. 31, 1985

[54] SURFACTANT FREE STABLE HYPOCHLORITE PASTE

[75] Inventors: Fred K. Rubin, Leonia; David V. Blarcom, West Milford; Daniel J. Fox, Hawthorne, all of N.J.

[73] Assignee: Lever Brothers Company, New York, N.Y.

[21] Appl. No.: 635,981

[22] Filed: Jul. 30, 1984

Related U.S. Application Data

[63] Continuation of Ser. No. 284,292, Jul. 17, 1981, abandoned.

[51] Int. Cl.[4] .......................... C01B 11/00; C11D 7/54
[52] U.S. Cl. .................................. 252/187.23; 252/94; 252/95; 252/103; 252/174.14; 252/187.24; 252/187.26; 423/474

[58] Field of Search ...................... 252/187.23, 187.24, 252/187.26, 95, 94, 103, 174.14, 313 S; 424/149; 423/474

[56] References Cited

U.S. PATENT DOCUMENTS 4,116,849 9/1978 Leikham .............................. 252/103
4,287,079 9/1981 Robinson ............................ 252/103

Primary Examiner—A. Lionel Clingman
Attorney, Agent, or Firm—James J. Farrell

[57] ABSTRACT

This invention discloses a stable, surfactant-free, aqueous hypochlorite paste readily dispersible in hot or cold water, thickened with non-reactive inorganics without having alkali metal silicates, providing up to 10% available chlorine and with a viscosity ranging from about 25,000 to about 2,000,000 CPS.

3 Claims, No Drawings

SURFACTANT FREE STABLE HYPOCHLORITE PASTE

This is a continuation of Ser. No. 284,292 filed 7/17/81 now abandoned.

This invention relates to the field of bleaching agents, more particularly to aqueous chlorinated bleaching pastes.

Hypochlorite-containing compositions of various types are known as described in U.S. Pat. Nos. 3,558,496; 3,666,679; 3,843,548; 4,071,463; 4,116,849 and 4,155,871. Certain compositions or processes use non-aqueous organic agents, others employ low levels of hypochlorite, some are liquids, still others use surfactants and various ingredients as a part of the process or composition. None of the above patents discloses applicants' particular composition of a surfactant-free, aqueous hypochlorite paste thickened with non-reactive inorganics and which does not require alkali metal silicates and can provide up to 10% available chlorine and which has a viscosity ranging from about 25,000 to about 2,000,000 CPS and is stable under ambient conditions.

The composition of the present invention is useful in several ways including as a chlorine source in conjunction with paste or gel type automatic dishwasher detergents or, when used alone, as bleach pastes for the removal of localized stains, etc. Furthermore, all paste compositions prepared according to our invention are readily dispersible in cold or hot water. We may note that when used in conjunction with automatic dishwasher detergents, it is critical that the viscosity of the paste be not below about 13,000 CPS so that any substantial leakage from the dispenser cup is avoided.

It is, therefore, an object of the present invention to substantially overcome the limitations of the prior art and to provide a surfactant-free hypochlorite paste of improved chlorine stability.

It is a further object of the present invention to provide inorganic thickening agents which will promote good physical stability of the thickened composition without accelerating the decomposition of the hypochlorite.

Other objects and advantages will appear as the description proceeds.

The attainment of the above objects is made possible by this invention which includes a stable aqueous readily dispersible in hot or cold water hypochlorite paste composition having a viscosity from about 25,000 CPS to greater than about 2,000,000 CPS, consisting essentially of (a) from about 5% to about 70% inorganic thickeners selected from the group consisting of natural colloidal clays, synthetic clays, metal oxides, alkaline earth metal carbonates, fumed silicas, pulverized amorphous silica gels and mixtures thereof; (b) about 5% to about 85% of an aqueous sodium hypochlorite solution having from about 4.0% to about 14% available chlorine; and (c) optionally a sufficient amount of an alkaline agent selected from the group consisting of alkali metal hydroxides whereby the pH of said paste is brought to a value of greater than about 12.0.

The viscosities are measured by a Brookfield Synchro-Lectric Viscometer, Model LVT. All measurements were made with Spindle No. 4, and the rpm employed varied from 0.3 (for viscosities between 20,000–2,000,000 cps) to 6.0 (for viscosities from 1000 to 100,000 cps).

The thickeners employed according to the present invention are inorganic materials which do not interact with hypochlorite. These materials, in finely ground form, are stirred into the hypochlorite solution to form stable, viscous suspensions. Materials suitable for this purpose include natural colloidal clays, synthetic clay products, metal oxides, alkaline earth metal carbonates, silica derived products and mixtures thereof. The thickener level ranges from about 5% to about 70%. It is important to note that the inorganic thickeners utilized be relatively free from heavy metal ion impurities in order to prevent catalytic hypochlorite decomposition and a resultant buildup of gaseous reaction products.

The natural clays applicable to our invention fall primarily into two major groups, namely attapulgites and smectites (montmorillonites). Attapulgites, for example, are represented by the Attagel based clays of the Engelhard Minerals & Chemicals Corp. and smectites are represented by alkali and alkaline earth metal bentonites such as Imvite FGB from Industrial Mineral Ventures, Inc.

Synthetic clay products are exemplified by multi-layered silicates similar in structure to natural smectite clays. Such synthetic clays are available under the trade name of Barasym Synthetic Minerals from NL-Industries. These materials vary in electrolyte sensitivity and must be individually selected to produce optimum physical stability of the thickened hypochlorite pastes.

It is critical in order to produce a stable hypochlorite paste that the level of thickeners be maintained within certain limits. For Attagel, the critical level is from about 10% to about 18% by weight of the composition. The critical range for Bentonite is about 7% to about 40% and for Barasym-PNS the critical range is about 7% to about 20%.

Viscosities from about 25,000 CPS to greater than 2,000,000 CPS of the paste may be obtained by using these critical limits.

Metal oxides are exemplified by zinc oxide, titanium dioxide, calcium oxide, magnesium oxide and the like. It is critical that the level of zinc oxide (J. T. Baker Chem. Co., Zinc Oxide Powder, Analyzed Reagent) when used alone as a thickener be maintained at about 55% by weight of the composition to obtain a stable product. Below the 55% level of zinc oxide, the paste composition separates rapidly whereas above 55% the composition loses its paste characteristics, solidifies rapidly and becomes difficult to stir and work with. The critical level for titanium dioxide (J. T. Baker Chem. Co., Titanium Dioxide CP, Analyzed Reagent) is about 50% to about 55% and for magnesium oxide (Fluka A. G., Magnesium Oxide puriss, p.a.) the critical level is about 50% to about 58%, the viscosity obtained therefrom in both cases being about 2,000,000 CPS. It is to be understood that the critical levels of these metal oxides would, of course, require adjustment with a change in particle size.

Typical alkaline earth metal carbonates, of the type used in the compositions of instant invention, are calcium carbonate and magnesium carbonate. The critical range for alkaline earth metal carbonates, e.g., calcium carbonate, is about 60% to about 68% by weight of the composition, the viscosity obtained therefrom being about 40,000 to about 200,000 CPS.

Silica derived products are represented by fumed silicas and pulverized amorphous silica gels. An example of the latter are the Syloid brand silicas of W. R. Grace & Co.

The critical range for colloidal silica, e.g., Syloid-244, is about 11% to about 20% by weight of the composition, the viscosity obtained therefrom being about 30,000 to about 700,000 CPS.

In addition to the inorganic thickening agent, the compositions may also contain alkaline and sequestering agents. It is well known in the art that hypochlorite decomposition and the loss of available chlorine can be slowed by maintaining the hypochlorite containing system at a relatively high pH, e.g. about 12.5 to 13.0. To maintain the required high pH, alkaline agents such as sodium, potassium, calcium or magnesium hydroxide and the like, may be added to the compositions. It should be understood that it is only the chlorine stability of the hypochlorite paste which is dependent on the pH of the composition, the viscosity and physical stability of the paste, per se, being independent of the high pH.

The presence of traces of heavy metals may catalyze hypochlorite decomposition and further induce chlorine losses. To minimize such losses, sequestering agents which do not react with hypochlorite may be incorporated in the composition of the instant invention, e.g., polyphosphates, such as tetrapotassium pyrophosphate or sodium tripolyphosphate.

The following examples, without limitation on the scope thereof, further illustrate our invention. All proportions and percentages herein and in the appended claims are by weight unless specified otherwise.

EXAMPLE I

A thick, free flowing, physically stable paste was obtained by mechanically mixing the following. The term "stable" or "stability" as used herein indicates that the composition essentially remains physically unchanged, the change in available chlorine level being substantially the same as in a corresponding unthickened hypochlorite solution.

|  |  | % by Weight |
|---|---|---|
| Bentonite clay (Imvite FGB) |  | 7.0 |
| Sodium hypochlorite solution (10.6% available chlorine) |  | 18.9 |
| Distilled water |  | 74.1 |
|  |  | 100.0 |
| Adjusted with sodium hydroxide to pH 12.4 |  |  |
| Theoretical available chlorine |  | 2.00% |
| Measured available Cl$_2$ | Initially | 1.99% |
| Cl$_2$ availability after storage at ambient conditions |  |  |
| for 2 wks. |  | 1.96% |
| for 5 wks. |  | 1.92% |
| for 8 wks. |  | 1.89% |

An unthickened aqueous sodium hypochlorite control with initial available Cl$_2$ of 2.0% contained 1.95% available Cl$_2$ after five weeks and 1.93% Cl$_2$ after eight weeks at ambient conditions indicating that the addition of thickening agents according to the present invention did not affect the hypochlorite solution in any significant manner. Those skilled in the art know that a deterioration in the level of available chlorine readily occurs when certain conventional thickening materials are added to the hypochlorite solution. As the data herein indicate, our compositions remain stable without being affected by the addition of the thickeners to the aqueous hypochlorite.

Available chlorine was determined by the ASTM method D2022-64.

EXAMPLE II

A paste composition of good physical stability was obtained by mechanically mixing the following:

|  |  | % by Weight |
|---|---|---|
| Attapulgite clay (Attagel 40) |  | 15.1 |
| Sodium hypochlorite solution |  | 84.9 |
| (12.3% available Cl$_2$) |  |  |
|  |  | 100.0 |
| Adjustment with sodium hydroxide to pH 13.0 |  |  |
| Available chlorine level: |  |  |
| Theoretical: |  | 10.50% |
| Measured: | Initially | 10.47% |
| After storage at ambient conditions |  |  |
| for 1 week |  | 9.54% |
| 10 weeks |  | 5.53% |

An unthickened aqueous hypochlorite control with initial average Cl$_2$ of 10.4%, dropped to 9.79% average Cl$_2$ after one week and 6.99% average Cl$_2$ after ten weeks at ambient conditions.

The above composition remained physically stable beyond ten weeks.

EXAMPLE III

A physically stable, thick, light colored, semi-translucent paste was obtained by blending a synthetic, micronsized, amorphous silica (Syloid 244) with sodium hypochlorite solution:

|  |  | % by Weight |
|---|---|---|
| Syloid 244 |  | 11.10 |
| Calcium hydroxide |  | 0.20 |
| Sodium hypochlorite solution (11.78%) |  | 42.44 |
| Distilled water |  | 46.26 |
|  |  | 100.00 |
| Adjustment with sodium hydroxide to pH 13.07 |  |  |
| Available chlorine level: |  |  |
| Theoretical: |  | 5.0% |
| Measured: | Initially | 4.89% |
| After storage at ambient conditions for three weeks | 4.54% |  |

EXAMPLE IV

A viscous, but free-flowing semi-translucent paste was obtained by thickening a sodium hypochlorite solution with a synthetic multilayered silicate similar in structure to smectite clay (Barasym PNS).

|  |  | % by Weight |
|---|---|---|
| Barasym PNS |  | 7.00 |
| Sodium hypochlorite solution (10.83% available Cl$_2$) |  | 18.48 |
| Water |  | 74.52 |
|  |  | 100.00 |
| The composition was adjusted to pH 13. |  |  |
| Available chlorine level: |  |  |
| Theoretical: |  | 2.0% |
| Measured: | Initially | 2.0% |
| After storage at ambient conditions for 36 weeks |  | 1.27% |

This composition remained physically stable for 36 weeks.

EXAMPLE V

A physically stable, highly viscous, semi-translucent paste composition of high available hypochlorite concentration was obtained as follows:

|  | % by Weight |
|---|---|
| Barasym PNS | 21.26 |
| Sodium hypochlorite solution (12.7% available $Cl_2$) | 78.74 |
|  | 100.00 |

The composition was adjusted to pH 13.
This paste had an initial available $Cl_2$ of 10.0%.
This composition remained physically stable for about 36 weeks.

EXAMPLE VI

A physically stable, white opaque paste composition was obtained by blending a finely ground calcite ($CaCO_3$) material—Durcal 2NH, ex Omya—with sodium hypochlorite solution. The calcite may serve the additional function of a scouring agent.

|  | % by Weight |
|---|---|
| Calcium carbonate (Durcal 2NH) | 59.2 |
| Sodium hypochlorite solution (12.24% available $Cl_2$) | 40.8 |
|  | 100.0 |

The composition was adjusted to pH 12.7.
The composition remained physically stable for over twenty weeks.

EXAMPLE VII

A paste composition utilizing titanium dioxide ($TiO_2$) as a thickener is illustrated below.

|  | % by weight (active basis) |
|---|---|
| Sodium hypochlorite | 4.7 |
| Titanium dioxide | 55.0 |
| Water | 40.3 |
|  | 100.0 |

Stable for over 5 weeks.

EXAMPLE VIII

A paste composition utilizing magnesium oxide (MgO) as a thickener is illustrated below.

|  | % by weight (active basis) |
|---|---|
| Sodium hypochlorite | 4.76 |
| Magnesium oxide | 55.60 |
| Water | 39.64 |
|  | 100.00 |

Stable for at least 5 weeks.

EXAMPLE IX

We have discovered that the thickeners described heretofore above, may be used in combination with each other to provide a stable, dispensible (e.g., via a squeeze tube and the like) composition. In fact, we have made a surprisingly advantageous discovery that paste compositions prepared by combining different thickeners require a lower concentration of the thickeners than do pastes which are thickened with only one thickener. Such compositions are illustrated in the formulation tabulated below and in Example X.

|  | % by Weight |
|---|---|
| Sodium hypochlorite | 5.25 |
| Zinc oxide | 25.00 |
| Attapulgite (Attagel 40) | 8.00 |
| Water | 61.75 |
| Total | 100.00 |

The viscosity of this composition is greater than 2,000,000 CPS and it is stable over 5 weeks.

EXAMPLE X

The paste composition shown below was obtained by mixing the following:

|  |  | % by Weight |
|---|---|---|
| Attapulgite clay (Attagel 40) |  | 9.9 |
| Zinc oxide |  | 5.0 |
| Calcium hydroxide |  | 0.2 |
| Sodium hypochlorite solution (11.78% available $Cl_2$) |  | 84.9 |
|  |  | 100.0 |
| Adjustment with sodium hydroxide to pH 13.07 |  |  |
| Available chlorine level: |  |  |
| Theoretical: |  | 10.0% |
| Measured: | Initially | 9.97% |
| After storage at ambient conditions for three weeks |  | 7.98% |

This composition remained physically stable beyond five weeks.

It is understood that the examples and embodiments described herein are for illustrative purposes only and that various modifications or changes in the light thereof will be suggested to persons skilled in the art and are to be included within the spirit and purview of this application and the scope of the appended claims.

What is claimed is:

1. A stable aqueous, readily dispersible in hot or cold water hypochlorite paste composition having a viscosity of about 25,000 CPS to about 2,000,000 CPS, consisting essentially of in percent by weight of said composition:
   (a) inorganic thickeners selected from the group consisting of about 55% zinc oxide, about 50% to about 55% titanium dioxide and about 50% to about 58% magnesium oxide;
   (b) about 5% to about 85% of an aqueous sodium hypochlorite solution having from about 4.0 to about 14% available chlorine; and
   (c) optionally a sufficient amount of an alkaline agent selected from the group consisting of alkali or alkaline earth metal hydroxides whereby the pH of said paste is brought to a value of greater than about 12.0.

2. A hypochlorite paste composition according to claim 1 wherein the viscosity of said composition is about 1,500,000 CPS.

3. A hypochlorite paste composition according to claim 1 wherein the viscosity of said composition is about 2,000,000 CPS.

* * * * *